(12) United States Patent
Morishita

(10) Patent No.: US 6,742,122 B1
(45) Date of Patent: May 25, 2004

(54) DATA ENCIPHERMENT APPARATUS AND ILLEGAL ALTERATION PREVENTION SYSTEM

(75) Inventor: Takuya Morishita, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/420,554

(22) Filed: Oct. 19, 1999

(30) Foreign Application Priority Data

Oct. 19, 1998 (JP) .......................................... 10-297081

(51) Int. Cl.[7] .............................................. G06F 12/14
(52) U.S. Cl. ..................................................... 713/189
(58) Field of Search ................................ 713/181, 189, 713/200, 201; 380/28, 29, 37, 42, 43

(56) References Cited

U.S. PATENT DOCUMENTS

| 5,343,530 | A |   | 8/1994 | Viricel |
| 5,606,616 | A | * | 2/1997 | Sprunk et al. ............... 380/29 |
| 5,944,821 | A | * | 8/1999 | Angelo ....................... 713/200 |
| 6,438,235 | B2 | * | 8/2002 | Sims, III .................... 380/285 |

FOREIGN PATENT DOCUMENTS

| JP | 5-217033 |   | 8/1993 |
| JP | 6-259011 | A | 9/1994 |
| JP | 6-282227 | A | 10/1994 |
| JP | 9-231137 |   | 9/1997 |

* cited by examiner

Primary Examiner—Matthew Smithers
(74) Attorney, Agent, or Firm—Foley & Lardner LLP

(57) ABSTRACT

The invention to provide an encipherment apparatus and an illegal alteration prevention system which can prevent an attempt of alteration to and illegal use of data such as program codes by an illegal user. Enciphered program codes are divisionally stored in a plurality of blocks in an enciphered program storage section. A cryptographic key calculation section uses a one-way function such as a hash function of the program codes currently present on a main storage section to calculate a cryptographic key to be used for decipherment of those enciphered program codes of a block stored in the enciphered program storage section and to be executed subsequently. If any of the program codes is altered in order to illegally utilize the software, then correct cryptographic keys are not obtained later, and execution of the program is halted.

8 Claims, 4 Drawing Sheets

DATA ENCIPHERMENT APPARATUS AND ILLEGAL ALTERATION PREVENTION SYSTEM

BACKGROUND OF THE INVENTION

1. Field of the Invention

The present invention relates to a data encipherment apparatus and an illegal alteration prevention system for preventing alteration of computer software or data by an illegal user who tries to illegally use the software or data (illegal copying and so forth).

2. Description of the Related Art

A technique for preventing illegal copying of computer software is known and disclosed, for example, in Japanese Patent Laid-Open No. Hei 9-231137 entitled "Duplication Discrimination Method and Reading Out Apparatus". According to the apparatus, key codes having a particular error rate K are recorded on part of a CD-ROM (compact disk read only memory). The error rate K is selected to a value with which complete correction is impossible by an error correction coding-decoding apparatus provided in a reading out apparatus for a CD-ROM. If the CD-ROM is duplicated illegally, then the error rate of key codes varies. The apparatus described above makes use of the phenomenon just described to discriminate whether or not a CD-ROM loaded in the apparatus is an illegally duplicated CD-ROM and disables the reading out apparatus when the loaded CD-ROM is an illegally duplicated CD-ROM.

As an illegal copying prevention technique of a similar type, a system is widely known wherein simple hardware having a particular key is added to the system and, upon execution of a program, it is discriminated whether or not the key has a normal value and execution of the program is permitted only when the key has the normal value.

The prior art apparatus and system described above have the following problems.

The first problem resides in that it is difficult to analyze program codes and investigate by what mechanism illegal copying is discriminated. The reason is that illegal utilization of a program can be performed by analyzing the program codes using an analysis tool such as a disassembler tool and altering the program based on a result of the analysis.

The second problem resides in that, if program codes are altered, then execution of copying onto a medium cannot be prevented. The reason is that, if program codes of a program portion used for discrimination of a copied medium are altered such that they normally indicate that the medium is an original medium even if it is a copied medium, then execution of the software with the copied medium cannot be prevented. A similar problem is likely to occur not only with programs but also with data.

SUMMARY OF THE INVENTION

It is an object of the present invention to provide an encipherment apparatus and an illegal alteration prevention system which can prevent an attempt of alteration to and illegal use of data such as program codes by an illegal user.

In order to attain the object described above, according to an aspect of the present invention, there is provided a data encipherment apparatus, comprising means for dividing data into first to n+1th blocks, n being an integer equal to or greater than 1, cryptographic key production means for successively producing first to nth cryptographic keys based on the data of the first to nth blocks, respectively, encipherment means for successively enciphering the second to n+1th blocks with the first to nth cryptographic keys, respectively, and outputting means for successively outputting the first block and the enciphered second to n+1th blocks.

The outputting means may encipher the first block based on a 0th cryptographic key determined in advance and output the enciphered first block.

According to another aspect of the present invention, there is provided an illegal alteration prevention system for data, comprising a data processing apparatus, a file apparatus, and an encipherment apparatus for producing data to be written into the file apparatus, the encipherment apparatus including means for dividing data into first to n+1th blocks, n being an integer equal to or greater than 1, cryptographic key production means for successively producing first to nth cryptographic keys based on the data of the first to nth blocks, respectively, encipherment means for successively enciphering the second to n+1th blocks with the first to nth cryptographic keys, respectively, and outputting means for successively outputting the first block and the enciphered second to n+1th blocks.

According to a further aspect of the present invention, there is provided an illegal alteration prevention system for data, comprising a data processing apparatus, a file apparatus including a first storage area for storing a top block of data and a second storage area for storing n blocks of the data following the top block, n being an integer equal to or greater than 1, and an encipherment apparatus for producing data to be written into the file apparatus, the encipherment apparatus being operable to produce a first cryptographic key based on the data of the first storage area, encipher a first one of the n blocks with the first cryptographic key, successively produce ith cryptographic keys based on the data of the i−1th ones of the n blocks and successively encipher the ith blocks with the ith cryptographic keys, i being equal to or greater than 2 but equal to or smaller than n, the data processing apparatus including first reading out means for reading out the data of the first storage area, second reading out means for successively reading out the data of the second storage area, decipherment means for successively deciphering the ith blocks successively read out by the second reading out means with the ith cryptographic keys successively supplied thereto, and cryptographic key calculation means for producing the first cryptographic key based on the output of the first reading out means, supplying the first cryptographic key to the decipherment means, successively producing the ith cryptographic keys based on the deciphered outputs of the i−1th blocks from the decipherment means and successively supplying the ith cryptographic keys to the decipherment means.

The illegal alteration prevention system for data may be constructed such that the first storage area has stored therein the top block of the data which have been enciphered with the 0th cryptographic key determined in advance, and the first reading out means deciphers the data stored in the first storage area with the 0th cryptographic key and outputs the deciphered data.

The cryptographic key calculation means may use a one-way function to produce the first to nth cryptographic keys.

In the data encipherment apparatus and the illegal alteration prevention system, since most of program codes are enciphered, it itself is difficult to analyze the program codes using an analysis tool such as a disassembler tool. Further, since a one-way function of program codes being executed at present is calculated as a decipherment key by the cryptographic key calculation means and is used for decipherment of program codes to be executed next, it is difficult to alter and illegally use the program codes.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
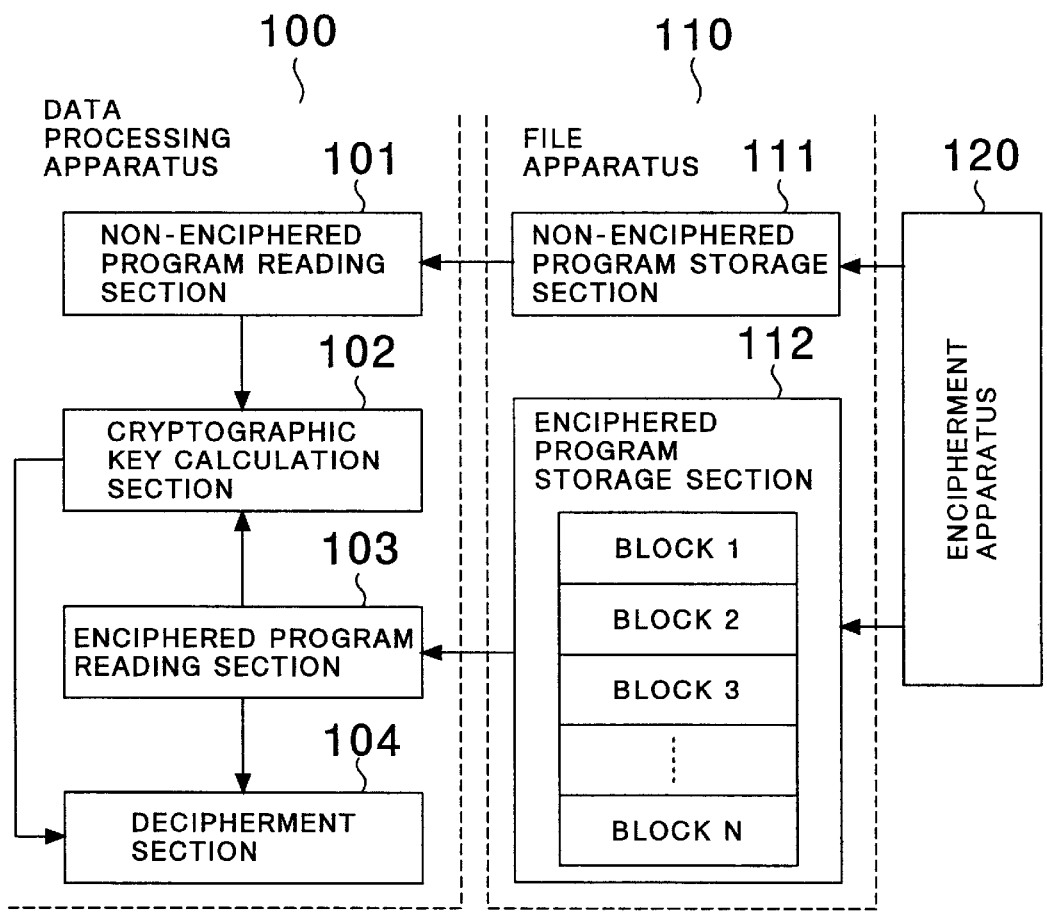
FIG. 1 is a block diagram of an illegal use prevention system to which the present invention is applied.

Referring first to FIG. 1, there is shown an illegal use prevention system for software to which the present invention is applied. The illegal use prevention system shown includes a data processing apparatus 100 which operates under program control, a file apparatus 110, and an encipherment apparatus 120. The data processing apparatus 100 includes a non-enciphered program reading section 101, a cryptographic key calculation section 102, an enciphered program reading section 103, and a decipherment section 104. The file apparatus 110 includes a non-enciphered program storage section 111 and an enciphered program storage section 112.

The non-enciphered program storage section 111 has non-enciphered program codes stored therein. The enciphered program storage section 112 has enciphered program codes stored divisionally in a plurality of blocks or programs 1, 2, ..., n therein. The non-enciphered program codes and the enciphered program codes are read into the data processing apparatus 100 in the order of the non-enciphered program codes stored in the non-enciphered program storage section 111 and the enciphered blocks 1, 2, ..., n.

The non-enciphered program reading section 101 reads the non-enciphered program codes from the non-enciphered program storage section 111 into a main storage section not shown.

The cryptographic key calculation section 102 uses a one-way function such as a hash function of the program codes present on the main storage section to produce a cryptographic key to be used for conversion of an enciphered program code block read in thereto into a plain text. The enciphered program reading section 103 reads in those enciphered program codes to be executed next from the enciphered program storage section 112 into the main storage section. The decipherment section 104 uses the cryptographic key calculated by the cryptographic key calculation section 102 to decipher the enciphered program codes.

Figure 4:
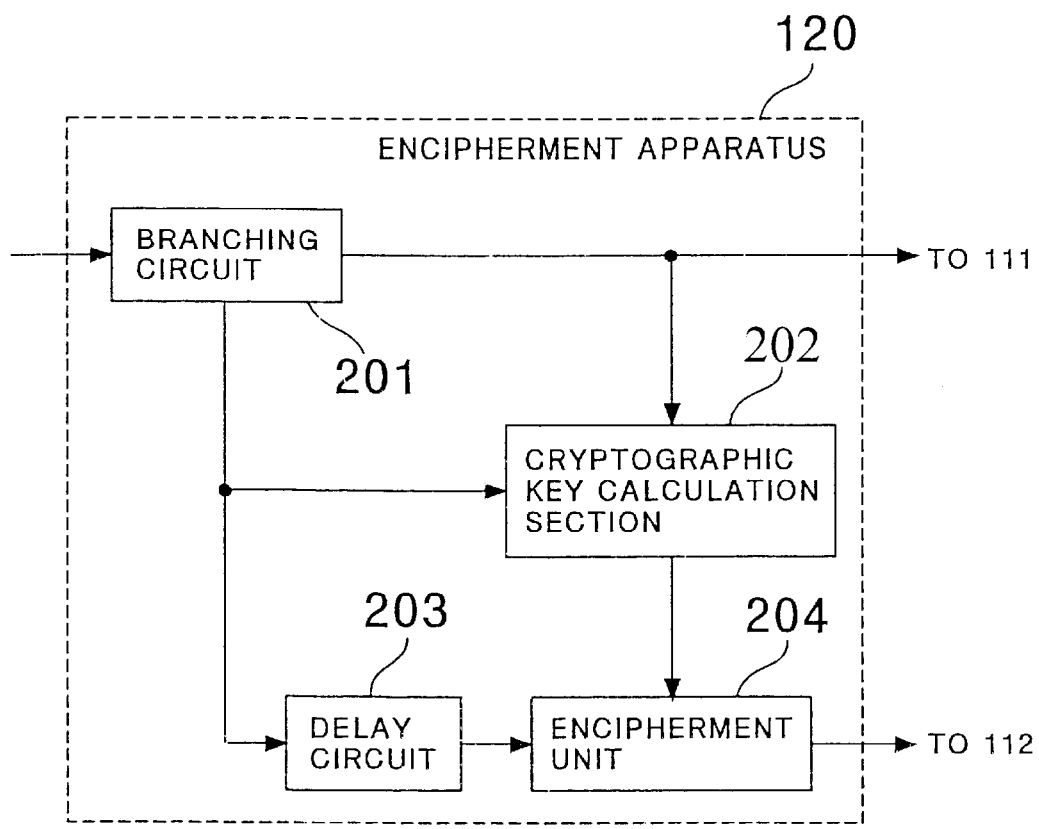
FIG. 4 is a block diagram showing a construction of an encipherment apparatus for producing data to be written into a file apparatus of the illegal use prevention system of FIG. 1.

The encipherment apparatus 120 for producing data to be written onto the file apparatus 110 is described below with reference to FIG. 4 in which a construction of the encipherment apparatus 120 is shown.

Program codes to be stored onto the file apparatus 110 are supplied to a branching circuit 201. The branching circuit 201 divides the program codes supplied thereto into n+1 blocks, and writes a top one of the blocks into the non-enciphered program storage section 111 shown in FIG. 1 and further supplies it to the cryptographic key calculation section 202. After the top block is outputted, the branching circuit 201 outputs the remaining n blocks except the top block or 0th block successively to the delay circuit 203 and the cryptographic key calculation section 102.

When the top block is received from the branching circuit 201, the cryptographic key calculation section 102 uses a one-way function such as a hash function of the program codes of the top block to calculate a first cryptographic key to be used for encipherment of data of the block (first block) next to the top or 0th block. After the first cryptographic key is outputted, the first block, the second block, ..., the nth block are successively supplied to the cryptographic key calculation section 102, and a second cryptographic key, ..., an nth cryptographic key are successively outputted from the cryptographic key calculation section 102 and supplied to an encipherment unit 204.

Meanwhile, the delay circuit 203 successively delays the first to nth blocks successively supplied thereto from the branching circuit 201 by one block interval and supplies the delayed blocks. As a result, the first block is enciphered with the first cryptographic key produced from the data of the 0th block and is stored into the enciphered program storage section 112 shown in FIG. 1. The second block is enciphered with the second cryptographic key produced from the data of the first block and is stored into the enciphered program storage section 112 shown in FIG. 1. Similarly, the ith block is enciphered with the ith cryptographic key produced from the i−1th block data and is stored into the enciphered program storage section 112 shown in FIG. 1.

In this manner, the non-enciphered program codes are stored into the non-enciphered program storage section 111 while the enciphered program codes are stored divisionally in a plurality of blocks 1, 2, ..., n into the enciphered program storage section 112.

Figure 2:
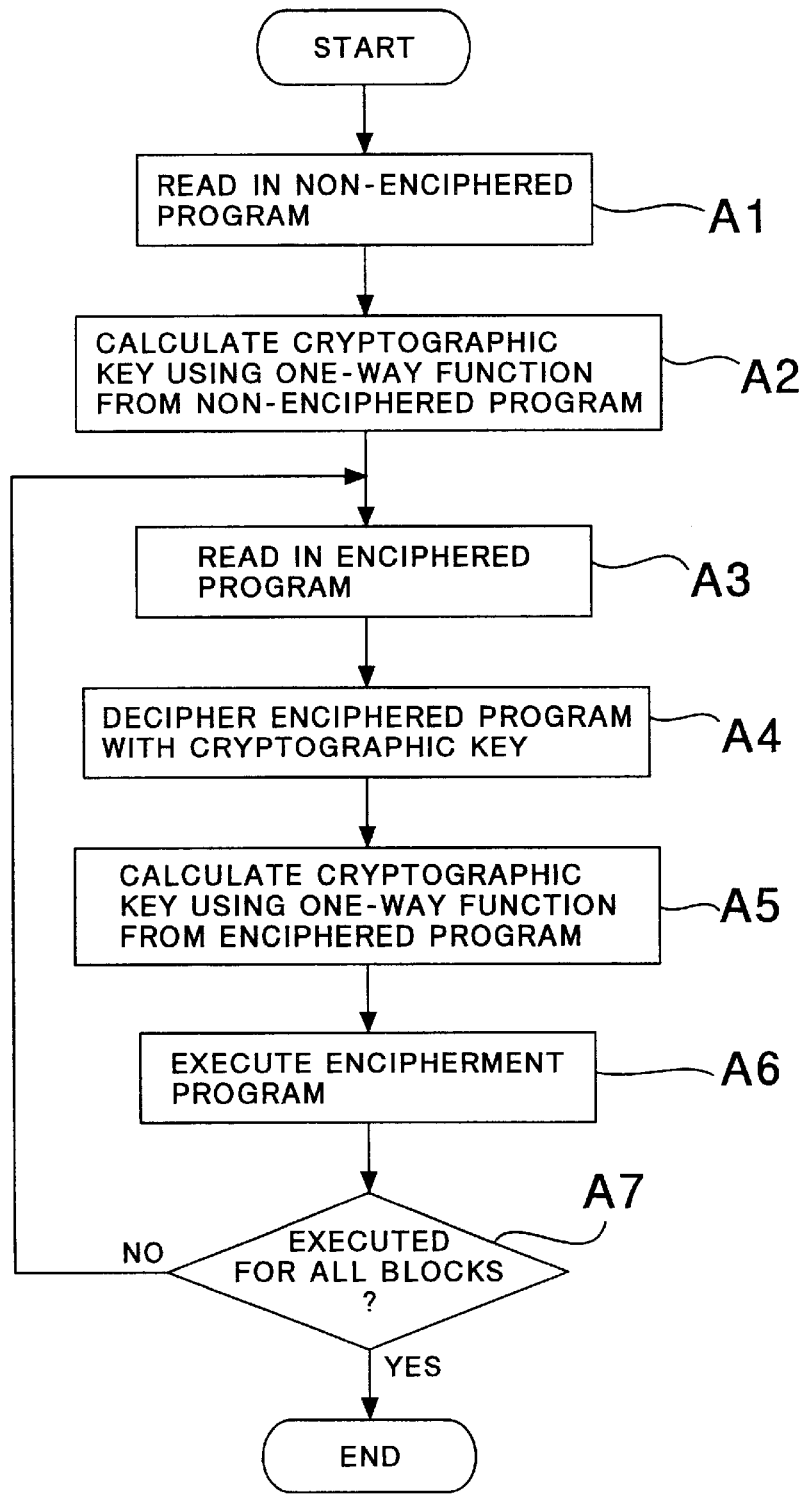
FIG. 2 is a flow chart illustrating operation of the illegal use prevention system of FIG. 1.

Now, operation of the entire illegal use prevention system is described in detail with reference to a flow chart of FIG. 2.

In the enciphered program storage section 112, program codes corresponding to program codes stored in the non-enciphered program storage section 111 are stored in a plurality of blocks each of which includes program codes enciphered using a hash value of the program codes of another block directly preceding to the block as a cryptographic key.

First in step A1, the non-enciphered program reading section 101 reads non-enciphered program codes from the non-enciphered program storage section 111 into the main storage section and starts execution of program coding. This processing is usually managed by a program execution mechanism of an operating system.

Then in step A2, the cryptographic key calculation section 102 converts the program codes read in the main storage section by the non-enciphered program reading section 101 with a one-way function such as a hash function to produce a cryptographic key.

In step A3, the enciphered program reading section 103 reads those enciphered program codes to be executed subsequently from the enciphered program storage section 112 into the main storage section.

In step A4, the decipherment section 104 uses the cryptographic key calculated by the cryptographic key calculation section 102 to decipher the enciphered program codes.

In step A5, the cryptographic key calculation section 102 calculates a hash value of the deciphered program codes to be used as a cryptographic key to be used for subsequent decipherment.

Then in step A6, the deciphered program codes currently present on the main storage section are executed. In this processing, discrimination of illegal copying and so forth are performed.

In step A7, it is discriminated whether or not the processing in steps A3 to A6 has been performed for the program codes of all of the blocks stored in the enciphered program storage section 112. If there remains some block for whose program codes the processing has not been performed as yet, then the control of the data processing apparatus returns to step A3.

Figure 3:
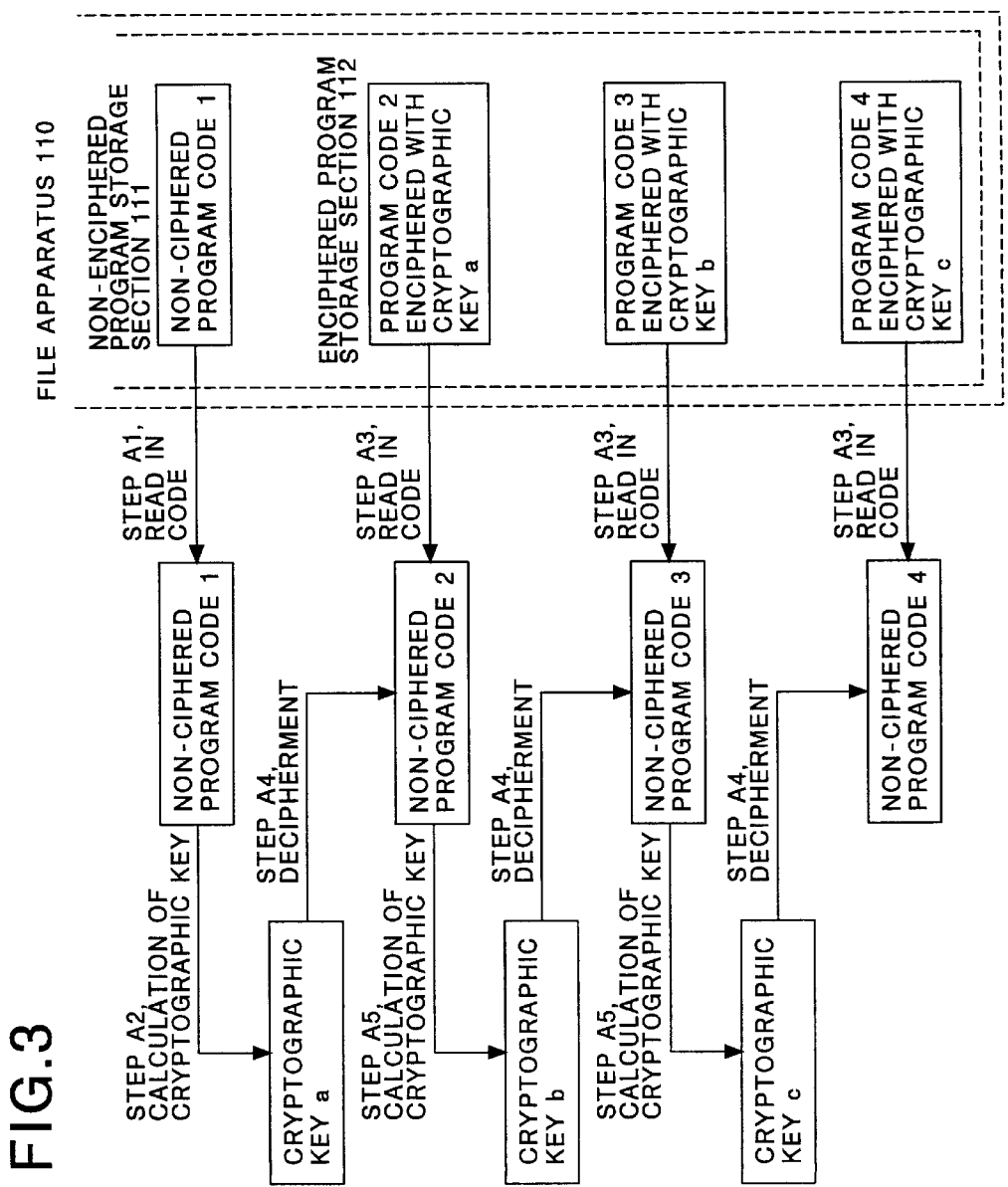
FIG. 3 is a flow diagram illustrating operation of the illegal use prevention system of FIG. 1 when an attempt to alter program codes is not performed by an illegal user.

FIG. 3 illustrates a flow of operation of the illegal use prevention system when an attempt to alter program codes has not been performed by an illegal user. If no alteration to program codes has been performed, then correct values are obtained with cryptographic keys a, b and c to be used for decipherment of enciphered program codes.

If a non-enciphered program code 1 stored in the non-enciphered program storage section 111 is altered, then the cryptographic key calculated in step A3 has a value quite different from the original cryptographic key a. Therefore, a program code 2 deciphered in step A4 is quite different from its original program code, and the program thereafter does not operate normally. Also when a program code in the enciphered program storage section 112 is altered, blocks following the altered program code are quite different from their original program codes when deciphered in step A4, and the program following the altered program code does not operate normally.

In this manner, if any of program codes is altered, then in order to allow the program following the altered program code to operate normally, it is necessary to acquire cryptographic keys of all of the following blocks by some means and alter the program codes of the following blocks such that the cryptographic keys can be used as cryptographic keys to be used by the decipherment section 104. The difficulty in such alteration as is preferable to an illegal user increases as the number of blocks increases.

While the illegal use prevention system of the present embodiment detects an alteration to a program code, also an alteration to data can be detected by using a one-way function of a data area upon production of a cryptographic key. In this instance, the "program" or "programs" in the foregoing description should be read as "data".

Further, while it is described in the foregoing description of the illegal use prevention system of the present embodiment that program codes or data in the non-enciphered program storage section 111 are stored in the form of a plane text not enciphered, apparently such program codes or data in the non-enciphered program storage section 111 may otherwise be stored in the form of program codes or data enciphered, with a predetermined cryptographic key. In this instance, the non-enciphered program reading section 101 of FIG. 1 has a function of deciphering the enciphered data in the non-enciphered program storage section 111 based on the predetermined cryptographic key.

While a preferred embodiment of the present invention has been described using specific terms, such description is for illustrative purposes only, and it is to be understood that changes and variations may be made without departing from the spirit or scope of the following claims.

What is claimed is:

1. A data encipherment apparatus, comprising:

means for dividing data into first to n+1th blocks, n being an integer equal to or greater than 1;

cryptographic key production means for successively producing first to nth cryptographic keys based on the data of the first to nth blocks, respectively, such that each key is produced based on data of the preceding block;

encipherment means for successively enciphering the second to n+1th blocks with the first to nth cryptographic keys, respectively, such that each numbered block is enciphered with the preceding numbered cryptographic key; and outputting means for successively outputting the first block and the enciphered second to n+1th blocks.

2. A data encipherment apparatus as claimed in claim 1, wherein said outputting means enciphers the first block based on a 0th cryptographic key determined in advance and outputs the enciphered first block.

3. An illegal alteration prevention system for data, comprising:

a data processing apparatus;

a file apparatus; and an encipherment apparatus for producing data to be written into said file apparatus;

said encipherment apparatus including:

means for dividing data into first to n+1th blocks, n being an integer equal to or greater than 1;

cryptographic key production means for successively producing first to nth cryptographic keys based on the data of the first to nth blocks, respectively, such that each key is produced based on data of the preceding block;

encipherment means for successively enciphering the second to n+1th blocks with the first to nth cryptographic keys, respectively, such that each numbered block is enciphered with the preceding numbered cryptographic key; and outputting means for successively outputting the first block and the enciphered second to n+1th blocks.

4. An illegal alteration prevention system for data, comprising:

a data processing apparatus;

a file apparatus including a first storage area for storing a top block of data and a second storage area for storing n blocks of the data following the top block, n being an integer equal to or greater than 1; and an encipherment apparatus for producing data to be written into said file apparatus, said encipherment apparatus being operable to produce a first cryptographic key based on the data of said first storage area, encipher a first one of the n blocks with the first cryptographic key, successively produce the ith cryptographic keys based on the data of the i−1th ones of the n blocks and successively encipher the ith blocks with the ith cryptographic keys, i being equal to or greater than 2 but equal to or smaller than n;

said data processing apparatus including:

first reading out means for reading out the data of said first storage area;

second reading out means for successively reading out the data of said second storage area;

decipherment means for successively deciphering the ith blocks successively read out by said second reading out means with the ith cryptographic keys successively supplied thereto; and cryptographic key calculation means for producing the first cryptographic key based on the output of said first reading out means, supplying the first cryptographic key to said decipherment means, successively producing the ith cryptographic keys based on the deciphered outputs of the i−1th blocks from said decipherment means and successively supplying the ith cryptographic keys to said decipherment means.

5. An illegal alteration prevention system for data as claimed in claim 4, wherein the data are program codes.

6. An illegal alteration prevention system for data as claimed in claim 4, wherein said first storage area has stored therein the top block of the data which have been enciphered with the 0th cryptographic key determined in advance, and said first reading out means deciphers the data stored in said first storage area with the 0th cryptographic key and outputs the deciphered data.

7. An illegal alteration prevention system for data as claimed in claim 4, wherein said cryptographic key calculation means uses a one-way function to produce the first to nth cryptographic keys.

8. A data encipherment method, comprising the steps of:

dividing data into first to n+1th blocks, n being an integer equal to or greater than 1;

successively producing first to nth cryptographic keys based on the data of the first to nth blocks, respectively, such that each key is produced based on data of the preceding block;

successively enciphering the second to n+1th blocks with the first to nth cryptographic keys, respectively, such that each numbered block is enciphered with the preceding numbered cryptographic key; and successively outputting the first block and the enciphered second to n+1th blocks.

* * * * *